United States Patent
Cameron et al.

(10) Patent No.: US 10,768,592 B2
(45) Date of Patent: *Sep. 8, 2020

(54) CONTROL APPARATUS FOR INDUSTRIAL PLANT DATA PROCESSING AND ASSOCIATED METHODS

(71) Applicant: NL Fisher Supervision & Engineering Ltd., Calgray (CA)

(72) Inventors: Michael William Cameron, Calgary (CA); Daniel Joseph Jalbert, Cochrane (CA)

(73) Assignee: NL FISHER SUPERVISION & ENGINEERING LTD., Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/262,888

(22) Filed: Jan. 30, 2019

(65) Prior Publication Data

US 2019/0163151 A1     May 30, 2019

Related U.S. Application Data

(63) Continuation of application No. 14/984,388, filed on Dec. 30, 2015.

(51) Int. Cl.
| | |
|---|---|
| *G05B 19/042* | (2006.01) |
| *G05B 23/02* | (2006.01) |
| *G06F 11/32* | (2006.01) |
| *G06F 11/34* | (2006.01) |

(52) U.S. Cl.
CPC ....... *G05B 19/042* (2013.01); *G05B 23/0216* (2013.01); *G05B 2219/23258* (2013.01)

(58) Field of Classification Search
CPC .............. G06F 11/323; G06F 11/3409; G06F 3/04842; G06F 11/34; G06F 11/2294; G05B 19/042; G05B 2219/23258; G05B 15/02; G05B 23/0283; G06Q 10/0633; G06Q 50/04; G06Q 10/06395; E02F 9/2228; E02F 9/2235
USPC ............................................ 700/17, 83, 180
See application file for complete search history.

(56) References Cited

U.S. PATENT DOCUMENTS

| | | | |
|---|---|---|---|
| 10,234,838 B2 * | 3/2019 | Cameron | G05B 19/042 |
| 2010/0049490 A1 | 2/2010 | Walters et al. | |
| 2013/0212420 A1 | 8/2013 | Lawson et al. | |
| 2016/0098174 A1 | 4/2016 | Anghelescu et al. | |
| 2016/0290129 A1 | 10/2016 | Chorn | |

OTHER PUBLICATIONS

Tom Dichristopher, "Oil firms are swimming in data they don't use", Mar. 5, 2015, CNBC LLC, A Division of NBC Universal, downloaded from CNBC.com on Dec. 23, 2015 from http://www.cnbc.com/2015/03/05usenergyindustrycollectsalotofoperationaldatabutdoesntuseit.html.

* cited by examiner

*Primary Examiner* — Michael J Brown
(74) *Attorney, Agent, or Firm* — Franklin & Associates International Inc; Matthew F. Lambrinos

(57) ABSTRACT

The invention is related to the field of control apparatus, and in particular, to control apparatus configured to allow a user to control the processing of data. In particular, this invention relates to controlling the processing of industrial plant data by controlling selection of a geographical area. The selection of a geographical area may be implemented by controlling a display using a user interface controller.

17 Claims, 11 Drawing Sheets

Figure 5

| Name | m/day | Form | Type |
|---|---|---|---|
| NLF exp120 | 250 | C | H |
| Rock 123 | | | H |
| CNF 99 | | | H |
| Shale v2 | | | Dir |
| CNF 94 | | | H |
| CNF 102 | | | Dir |
| Shale 15 | | | V |

521 — popup:
○ Bellyr
✓ Card
○ Cardium
○ Cardss
○ Color
○ Duvern

522h → Shale v2

Figure 6

| Name | m/day | Form | Type |
|---|---|---|---|
| NLF exp120 | 25 | | |
| Rock 123 | 99 | | |
| CNF 99 | 12 | | |
| Shale v2 | 20 | Card | Dir |
| CNF 94 | 53 | Card | H |
| CNF 102 | 61 | Card | Dir |
| Shale 15 | 54 | Card | V |

621 — popup:
✓ Dir
✓ H
○ V

622h → Shale v2

| Name | m/day | Form | Type |
|---|---|---|---|
| NLF exp120 | 250 | Card | H |
| Rock 123 | 99 | Card | H |
| CNF 99 | 123 | Card | H |
| Shale v2 | 200 | Card | Dir |
| CNF 94 | 53 | Card | H |
| CNF 102 | 61 | Card | Dir |

722h points to Shale v2 row.

the less than 1 percent of the information gathered by the oil industry was being made available to the people in the industry who make decisions. The article suggested that, as a result, drillers are almost certainly operating below peak performance. The article also highlighted a report by consulting firm Bain & Co which estimated that better data analysis could help oil and gas companies boost production by 6 to 8 percent. The article concludes by stating that a problem is that while oilfield sensors offer real-time data on operations, the information is usually used to make immediate, binary decisions rather than being stored, filtered and analysed to inform future decision making.

CONTROL APPARATUS FOR INDUSTRIAL PLANT DATA PROCESSING AND ASSOCIATED METHODS

CROSS-REFERENCE TO RELATED APPLICATIONS

This application is a continuation of U.S. Non-Provisional application Ser. No. 14/984,388, filed on Dec. 30, 2015, the entire contents of which is incorporated herein by reference in its entirety and for all purposes.

FIELD OF THE INVENTION

This application is related to the field of control apparatus, and in particular, to control apparatus configured to allow a user to control the processing of data. In particular, this application relates to controlling the processing of data by controlling selection of a geographical area. The selection of a geographical area may be implemented by controlling a display using a user interface controller.

BACKGROUND OF THE INVENTION

In the oil and gas industry, for example, the efficiency of execution of a potential industrial plant (e.g. oil well) is extremely important as it has a significant impact on the capital cost of the operation. For example, the capital costs may be increased by technical difficulties relating to drilling. More specifically, if an oil well is drilled in the wrong location, the drilling phase may be lengthened or made more difficult (e.g. through geological factors such as rock type and oil depth) and/or the yield may be less than optimal.

Capital expenditures is particularly imported in engineering in the Upstream Energy sector, and so facilitating efficient decision making at a fundamental level has the potential to generate a large following within the industry.

To give an indication of the scale of the issue in monetary terms, Canadian Oil and Gas Exploration & Production revenue for 2015 was originally predicted to be $104.2 billion dollars. Of this, $45.9 billion was forecasted capital expenditures, with 6982 wells being drilled. Estimating 1% of the capital expenditures for well construction engineering results in $458 million in capital spent on well construction engineering.

Given the large investment required, it is important that location and historical information is available in an accessible format at the planning stage. This is particularly the case for industrial plants whose location is limited by natural geographic features (e.g. mining and oil and gas wells).

In the past, geographical and historical data for previous industrial plants in the oil and gas sector have been stored in a conventional database. For example, Current GIS systems in the marketplace (IHS Accumap, GeoLogic GeoScout, Canadian Discovery Frac Database) only take publicly available information and digitize it. Due to the large quantity of data (corresponding to hundreds of thousands of industrial plants, each plant's performance being measured by a variety of performance metrics), this information has not been available in a sufficiently accessible way because of the processing power required to filter and process the data to allow a user to interact with it.

For example, CNBC published an online news article entitled "Oil firms are swimming in data they don't use" (author: Tom DiChristopher; date: 5 Mar. 2015). The article reported that a study by McKinsey & Company found that

SUMMARY OF THE INVENTION

In accordance with a first aspect, there is provided a control apparatus comprising:

memory comprising a database having data on industrial plant performance, each datum associated with a location;

a display configured to display a map comprising a selected first geographical area, the first geographical area including a first subset of the corresponding locations in the database;

a processor configured to perform a first statistical analysis on the industrial plant performance data associated with the first subset of the corresponding locations in the database, and to enable display of results of the first statistical analysis on the displayed map; and a user interface controller configured to allow the user to change the selected geographical area displayed from the first geographical area to a second geographical area, the second geographical area including a second subset of the corresponding locations in the database, the second subset being different from the first subset;

wherein the processor is configured, in response to a change in the geographical area being selected, to perform a second statistical analysis on the industrial plant performance data associated with locations within the second selected geographical area and to enable display of results of the second statistical analysis on the displayed map.

The first and second statistical analyses may be the same with except that they are carried out on different data. That is, the second statistical analysis may be a rerun of the first statistical analysis on the second subset of data. The second statistical analysis may be performed automatically in response to the change in selected geographical area.

The selected geographical area may correspond to the area of a map displayed on the display, such that the user interface controller is configured to allow the user to change the selected geographical area by changing the area of a map displayed on the display.

The user interface controller may be configured to allow the user to change the selected geographical area by one or more of scrolling and zooming the area of a map displayed on the display. For example, if the area of the map displayed corresponds to the selected area, zooming the map may change the displayed area and so change the selected area. It will be appreciated that zooming a map may comprise changing the scale of the map displayed.

The industrial plant data may correspond to oil drilling industrial plants.

The industrial plant data may correspond to mining industrial plants.

The control apparatus may be configured to: in response to a user input, display a portion of the database corresponding to data associated with the selected locations.

The control apparatus may be configured to:

in response to a first user input, filter data in the database to generate a filtered subset of corresponding locations; and in response to a second user input, display a map corresponding to the filtered data.

The control apparatus may be configured:

to determine, as part of the statistical analysis, one or more of the average and the standard deviation parameters corresponding to the displayed subset of locations; and to enable display of the determinations by distinguishing locations based on how the parameter associated with each location compares with one or more of the determined average and the determined standard deviation.

The control apparatus may be configured: to enable, in response to a user input, selection of a geographical area by selecting a portion of a displayed map.

The control apparatus may be configured to: in response to a user input, enable selection of a geographical area by selecting a characteristic from a list of characteristics. The list of characteristics may comprise one or more of: rock formation, altitude, proximity to water source, and geographical aspect.

The control apparatus may be configured to: perform the statistical analysis on corresponding locations within the selected geographical area only when the number of corresponding locations is below a predetermined threshold.

The industrial plant locations may be displayed on the map using industrial plant icons. The results of the statistical analysis may be displayed on the displayed map by differentiating the industrial plant icons.

The industrial plant icons may be differentiated based on the statistical analysis using one or more of: different colours; different shapes; different sizes; different images; and different line styles.

The statistical analysis may comprise ranking the wells corresponding to locations within the selected geographical area.

The control apparatus may form part of for example, a personal digital assistant (PDA), a smartphone, a pager, a laptop computer, a tablet computer, a computer, or any combination of the aforementioned.

A user input may comprise a touch gesture (e.g. with a touchpad or touchscreen). A touch gesture may comprise one or more of: a multi-touch gesture input (e.g. pinch-in or pinch-out gesture); a single-touch gesture; a swiping gesture; and a tap gesture. A user input may comprise, for example, clicking and dragging a mouse; pressing a physical button; and/or interacting with user-interface elements displayed on the screen (e.g. icons, zoom level bar, navigation arrows).

A user interface controller may be considered to be a component which allows the user to control the device. A user interface controller may or may not display or otherwise provide information dynamically to the user.

In accordance with a further aspect, there is provided a method, the method comprising:

accessing a database having data on industrial plant performance, each datum associated with a location;

displaying a map comprising a selected first geographical area, the first geographical area including a first subset of the corresponding locations in the database;

performing a first statistical analysis on the industrial plant performance data associated with the first subset of the corresponding locations in the database, and to enable display of results of the first statistical analysis on the displayed map;

changing the selected geographical area displayed from the first geographical area to a second geographical area, the second geographical area including a second subset of the corresponding locations in the database, the second subset being different from the first subset; and performing, in response to a change in the geographical area being selected, a second statistical analysis on the industrial plant performance data associated with locations within the second selected geographical area and to enable display of results of the second statistical analysis on the displayed map.

In accordance with a further aspect, there is provided a control apparatus comprising:

memory comprising a database having data relating to multiple parameters associated with industrial plant performance, each datum associated with a location;

a display configured to display a map comprising a selected first geographical area, the first geographical area including a subset of the corresponding locations in the database;

a user interface controller configured to allow the user to select a performance indicator, the performance indicator corresponding to a relationship between one or more parameters from the database;

a processor configured to perform a statistical analysis, based on the selected performance indicator, on the industrial plant performance data associated with the subset of the corresponding locations in the database, and to enable display of results of the first statistical analysis on the displayed map.

Corresponding computer programs are also disclosed. Computer programs may be stored on a non-transitory medium (e.g. a CD, a DVD).

In accordance with a further aspect, there is provided a computer program, the computer program, when run on a computer, being configured to:

enable access of a database having data on industrial plant performance, each datum associated with a location;

enable display of a map comprising a selected first geographical area, the first geographical area including a first subset of the corresponding locations in the database;

perform a first statistical analysis on the industrial plant performance data associated with the first subset of the corresponding locations in the database, and to enable display of results of the first statistical analysis on the displayed map;

enable changing of the selected geographical area displayed from the first geographical area to a second geographical area, the second geographical area including a second subset of the corresponding locations in the database, the second subset being different from the first subset; and perform, in response to a change in the geographical area being selected, a second statistical analysis on the industrial plant performance data associated with locations within the second selected geographical area and to enable display of results of the second statistical analysis on the displayed map.

In accordance with a further aspect, there is provided a computer program, the computer program, when run on a computer, being configured to:

enable access of a database having data relating to multiple parameters associated with industrial plant performance, each datum associated with a location;

enable display of a map comprising a selected first geographical area, the first geographical area including a subset of the corresponding locations in the database;

enable selection of a performance indicator, the performance indicator corresponding to a relationship between one or more parameters from the database;

perform a statistical analysis, based on the selected performance indicator, on the industrial plant performance data associated with the subset of the corresponding locations in the database, and to enable display of results of the first statistical analysis on the displayed map.

These aspects may provide a means to efficiently display, filter, and analyze historical and location-dependent industrial plant execution data in a comparative manner to optimize engineering decision making processes. The system may permit rapid analysis and filtration of complex variables in order to perform statistical analyses for decision making purposes.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 5-7 is a display screen showing filtering of the data.

FIG. 8 is a display screen showing a map of the filtered data.

DETAILED DESCRIPTION OF THE INVENTION

With reference to the figures, a control apparatus is described. In this case, the control apparatus comprises: memory comprising a database having data on industrial plant performance, each datum associated with a location; a display configured to display a map comprising a selected first geographical area, the first geographical area including a first subset of the corresponding locations in the database; a processor configured to perform a first statistical analysis on the industrial plant performance data associated with first subset of the corresponding locations in the database, and to enable display of results of the first statistical analysis on the displayed map; a user interface controller configured to allow the user to change the selected geographical area displayed from the first geographical area to a second geographical area, the second geographical area including a second subset of the corresponding locations in the database, the second subset being different from the first subset; wherein the processor is configured, in response to a change in the selected geographical area being displayed, to perform a second statistical analysis on the industrial plant performance data associated with locations within the second selected geographical area and to enable display of results of the second statistical analysis on the displayed map.

Plant performance data may comprise one or more of: building progress (i.e. indicating how close the industrial plant is to completion); output (e.g. oil production for an oil well); down-time data (e.g. how much time is the plant not operational).

Specific to Upstream oil and gas development, the technology is applicable to drilling, completions, facility and pipeline construction, and production operations. It is also applicable to other industries where comparative data analysis techniques can be automated. Displaying the information in an aggregated and comparative manner is particularly useful for operational information in which geographic variation can exist in data (e.g. for mining, the rock types in a particular location may affect the efficiency of the drilling of the mine borehole).

Figure 1:
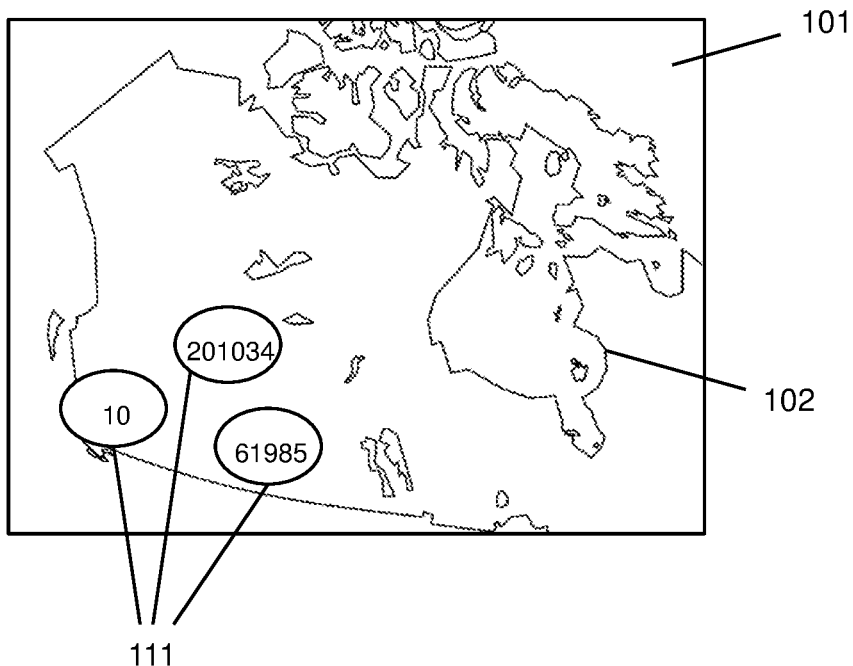
FIG. 1 is a display screen showing a map indicating the location of a number of industrial plants in the oil and gas sector.

FIG. 1 depicts the display of a first embodiment. In this case, the display 101 is a touch screen. That is, in this case, the screen is both the display and the user interface controller. It will be appreciated that in other embodiments, the display and the user interface controller may be separate (e.g. a screen and mouse).

The embodiment of FIG. 1 also comprises a memory (not shown) which comprises a database having data on industrial plant performance, each datum associated with a location. In this case, the industrial plants are in the oil and gas sector and correspond to, for example, existing oil wells (pre- and post-completion) and oil refineries.

In FIG. 1, the screen is showing a zoomed-out map 102 (corresponding to Canada). Because of the large number of industrial plants within the displayed location, the control apparatus is configured to group the industrial plant locations in clusters, and indicate the location of the clusters using user interface icons 111. In this case, the cluster user interface icons comprise a number indicating the number of industrial plant locations stored in the database in that cluster. It will be appreciated that the cluster user interface icons may be selectable by interacting with the user interface controller (e.g. by tapping or double-clicking). That is, in response to the cluster user interface icon being selected, the apparatus may be configured to show a map corresponding to the industrial plants in the cluster.

Figure 2:
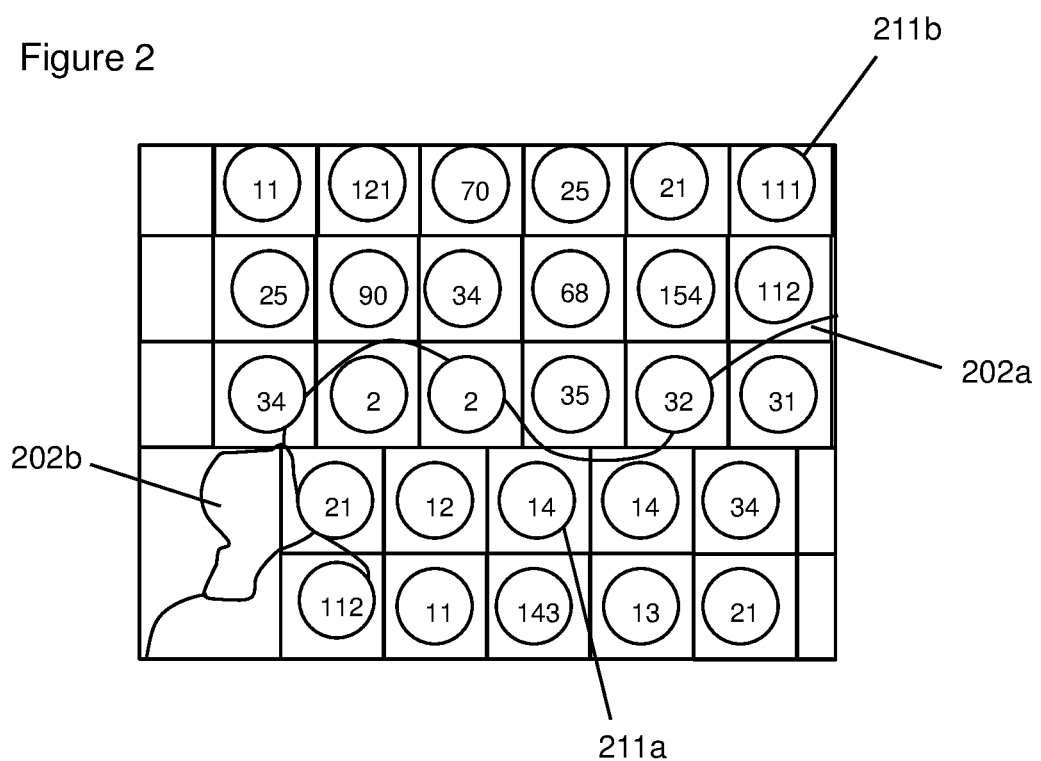
FIG. 2 is a display screen showing a zoomed-in map indicating the location of a number of industrial plants in the oil and gas sector.

FIG. 2 shows the display when the user has navigated to a smaller area using a combination of zooming and/or scrolling the map. In this case, the map is zoomed using a multi-touch gesture input (e.g. pinch-in or pinch-out gesture); and the map is scrolled using swiping gestures. It will be appreciated that, in other embodiments, the controller may be configured to enable zooming and/or scrolling in different ways—for example, clicking and dragging a mouse; and/or interacting with user-interface elements displayed on the screen (e.g. icons, zoom level bar, navigation arrows). In this case, the selected geographical area corresponds to the area of a map displayed on the display, such that the user interface controller is configured to allow the user to change the selected geographical area by changing the area of a map displayed on the display.

Although the geographical area of the displayed map in FIG. 2 is smaller (because is has been zoomed in), there are still too many industrial plants with locations within the map to allow each industrial plant to be identified individually. In this case, the cluster user interface icons (e.g. 211a, 211b) are configured to correspond to government designated regions (e.g. townships). As with the map of FIG. 1, the displayed maps of this embodiment comprise physical and/or non-physical features to enable the user to understand the portion of the map which is being displayed. For example, the features may comprise one or more of: natural physical features (e.g. lakes 202b, rivers 202a, coastline, mountains, contour lines); settlement locations (e.g. towns, villages, cities); man-made structures (e.g. roads, train tracks); and non-physical features (e.g. boundaries between states, provinces, townships, counties etc.).

Figures 3, 4:
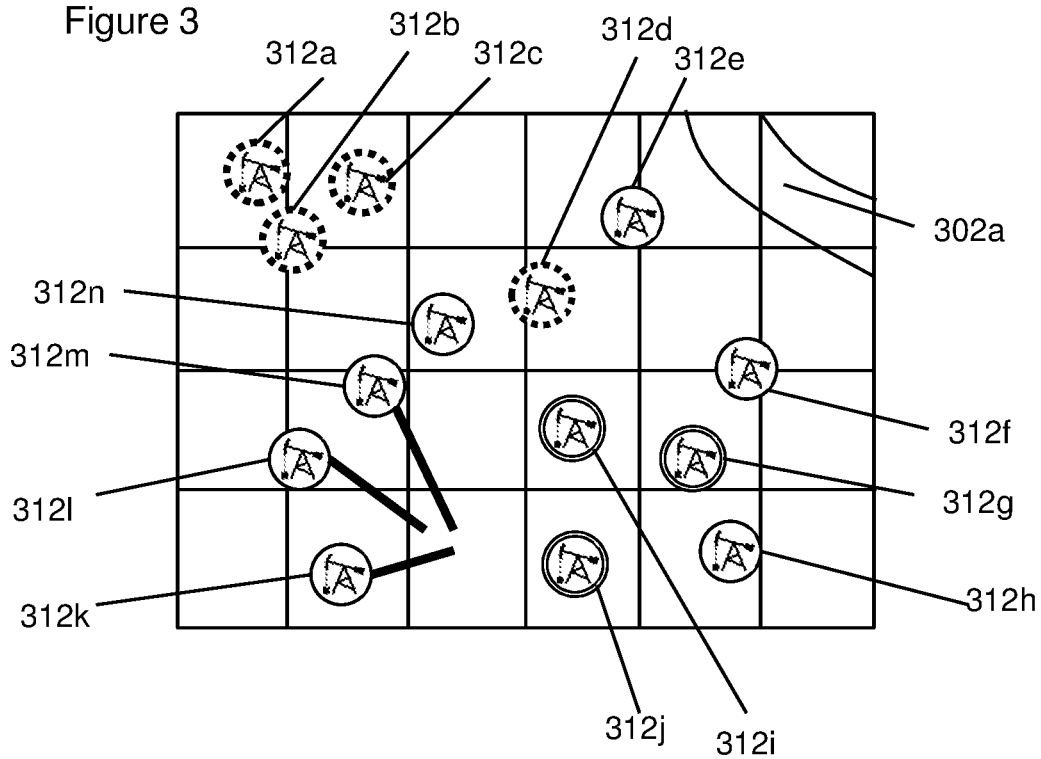
FIG. 3 is a display screen showing a further zoomed-in map indicating the location of a number of industrial plants in the oil and gas sector.
FIG. 4 is a display screen showing data corresponding to the displayed map.

In this case, the user selects the cluster user interface icon 211a corresponding to a particular township and, in response, the control apparatus zooms and/or scrolls the map to that township. The results are shown in FIG. 3. Because there are a sufficiently small number of industrial plant locations within the selected township, the control apparatus identifies the location of the each of the corresponding industrial plants individually using an industrial plant icon 312a-n. In this case, there are 14 individually identified plants. In other embodiments, the screen size and/or icon size may allow up to 500 individually identified plants.

The industrial plant icons 312a-n indicate the location of the corresponding plant either by being over the corresponding location (e.g. 312a) on the map or, if for example, the locations of multiple plants are too close together (e.g. 312k-m), by a line from the icon to the corresponding location on the map. In this case, the industrial plant icons 312a-n also indicate the type of the plant using an image within the icon. In this case, all of the industrial plants are oil rigs. If the map were configured to show, for example, oil refineries the corresponding icon may have an image denoting the location as the location of an oil refinery. It will be appreciated that the industrial plant icons may indicate other information such as: plant ownership or operator; plant stage (e.g. projected plant; pre-completion oil rig; post-completion oil rig).

In this embodiment, when the number of locations within the selected area is sufficiently small to allow them to be displayed individually, the processor of the control apparatus is configured to perform a first statistical analysis on the industrial plant performance data associated with first subset of the corresponding locations in the database, and to enable display of results of the first statistical analysis on the displayed map. That is, in this case, the selected area for statistical analysis corresponds to the displayed area of the map when the area of the map is sufficiently below a threshold area (the threshold in this case relating to how many individual plants can be displayed). By restricting the selection of an area for statistical analysis in this way, the processor does not attempt to perform the statistical analysis on a large area with a corresponding large number of data points. This may speed up navigation when large areas are being viewed.

In this case, the industrial plant icons 312a-n also indicate the results of a statistical analysis carried out on the displayed industrial plants shown on the map. In this case, the controller is configured to perform a statistical analysis on plants within the map (which corresponds to the selected geographical area in this case) and display the results. In this case, the statistical analysis comprises calculating the average (the mean in this case, but other averages may be used in other embodiments) and standard deviation of the drilling rate of the oil-rigs and determining which of the displayed industrial plants have a drilling rate greater than one standard deviation over average; which of the displayed oil-rig locations have a drilling rate within one standard deviation of average; and which of the displayed oil-rig locations have a drilling rate lower than one standard deviation below average. It will be appreciated that the statistical analysis may be performed on other parameters or combinations of parameters. These parameters may be key performance indicators (KPIs) associated with a particular field (e.g. drilling rate in a drilling context).

Other embodiments may allow user-selectable aggregation and analysis of data. For example, other embodiments may allow the user to customize the "binning" of the data and the type of statistical analysis (T-score, S-score, etc.). Other embodiments, may allow the user to define user-defined statistical comparators (Key Performance Indicators—KPI). In addition to the predetermined KPIs (meters/day; $/meter; Tonnes*meter/stages, IP30/$; IP30/tonnes, where IP (Initial Production Rate) is the initial flow rate of the well, typically 24-72 hours, and IP30 is the average Initial production for the 1st 30 Days; and frac intensity).

Other embodiments may be configured to allow statistical analysis of historical data in relation to engineering and operational input parameters.

In this case, the industrial plant icons 312g,i,j corresponding to locations having a drilling rate greater than one standard deviation over average are displayed with a double-line outline. The industrial plant icons 312e,f,h,k-n corresponding to locations having a drilling rate within one standard deviation of average are displayed with a single-line outline. The industrial plant icons 312a-d corresponding to locations having a drilling rate lower than one standard deviation below average are displayed with a dotted outline. It will be appreciated that other graphical indications may be used to indicate the results of the statistical analysis. For example, the size, colour and/or shape of the industrial plant icons may be used to indicate the results of the statistical analysis. In this way, the outliers can be quickly identified and each plant's performance ranked.

From the map of FIG. 3, it is apparent that there is a grouping of low-performance wells in the top left 312a-d, whereas the high-performance wells 312g,h,i are towards the bottom right. This may indicate that the geological conditions are more favorable in locations corresponding to the bottom right of the map. It will be appreciated that this information is more readily extracted from a map view than from a database view of the database. This information may be used in determinations of future oil-rig locations and for identification of optimum executional practices.

In this case, the user can also view the corresponding database portion. FIG. 4 shows the database view corresponding to the map view of FIG. 3. That is, the database view shows a scrollable subset of the database corresponding to the locations within the corresponding displayed map.

In this way, the user can control which subset of the database is shown by controlling the extent and position of the map. As with the map, the tuples or rows of the database are visually distinguished based on the statistical analysis. In this case, the industrial plant data rows 422i corresponding to locations having a drilling rate greater than one standard deviation over average are displayed with a double-line underline. The industrial plant data rows 422f,h,k-m corresponding to locations having a drilling rate within one standard deviation of average are displayed with a single-line underline. The industrial plant data rows 422d corresponding to locations having a drilling rate lower than one standard deviation below average are displayed with a dotted underline. It will be appreciated that other graphical indications may be used to indicate the results of the statistical analysis. For example, the size, colour (e.g. red for below average; yellow for average; and green for above average) and/or font may be used to indicate the results of the statistical analysis.

FIGS. 5 and 6 show how the user can interact with the database subset corresponding to the mapped area to filter out undesired data. In this case, the user is particularly interested in oil-rigs which have been drilled in a particular rock formation (Cardium, in this case); and oil-rigs with a particular well-structures (horizontal or directional wells). That is, the user may be planning to start a new well in a Cardium rock formation and may know from surveys that a vertical well may not be sufficient to access the oil. In this case, the user can select the column headers which show a corresponding list 521, 621 of the available entries in that list. By selecting some of the entries (indicated by a tick) and not selecting other available entries (indicated by a circle), the user can filter the rows or tuples in the database subset. FIG. 5 show how the user has selected cardium formations and FIG. 6 shows how the user has selected Directional and Horizontal wells.

Figures 7, 8:
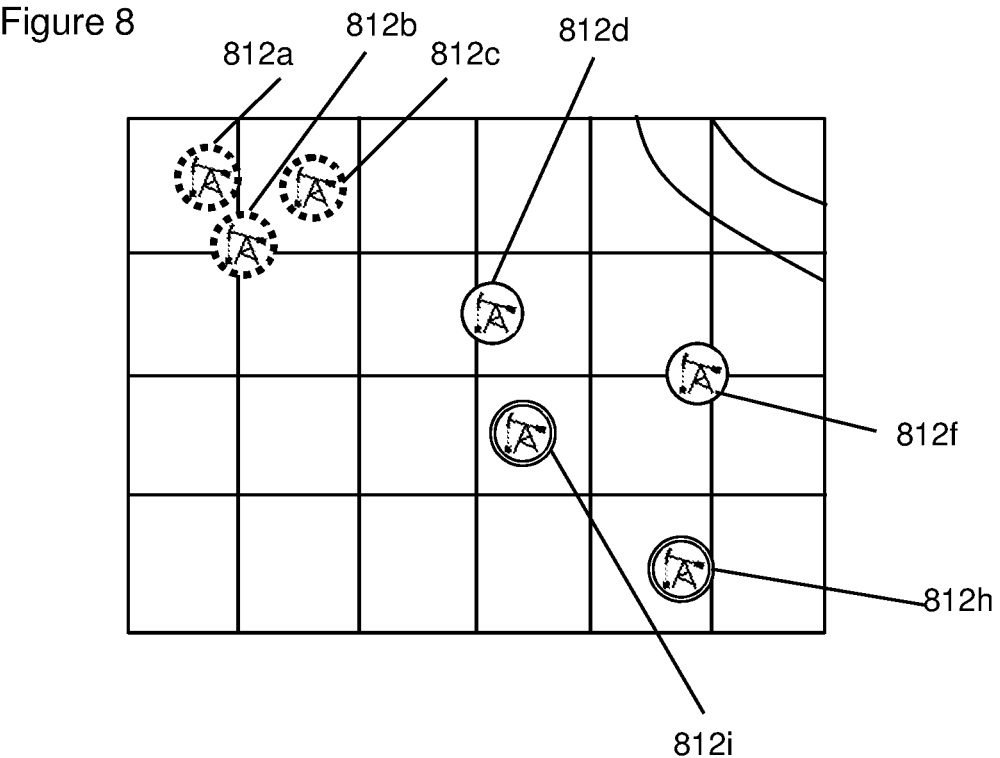

FIG. 7 shows the results of the filtering. In this case, the controlling apparatus is configured to re-run (e.g. automatically) the statistical analysis when the filtering is complete or at each filtering stage. It will be appreciated that the removal or addition of certain industrial plant data may affect the average and standard deviation of the remaining filtered industrial plant data. For example, although the 'Shale v2' well was within 1 standard deviation of the average before filtering (indicated by a single underline in FIG. 4), after filtering, the 'Shale v2' well is now more than one standard deviation above average (indicated by a double underline in FIG. 7). It will be appreciated that, in some embodiments, the filtering may be performed in the map view (e.g. using a list and/or filtering wells to have a particular parameter, such as rock formation, the same as an individual selected plant).

The user then reverts to the map view, as shown in FIG. 8. As shown in FIG. 8, the industrial plant icons 812a-d,f,h-i have been updated to reflect the filtering of the plant data (few industrial plants are indicated on the map) and the new statistical analysis on the filtered data.

Figure 9:
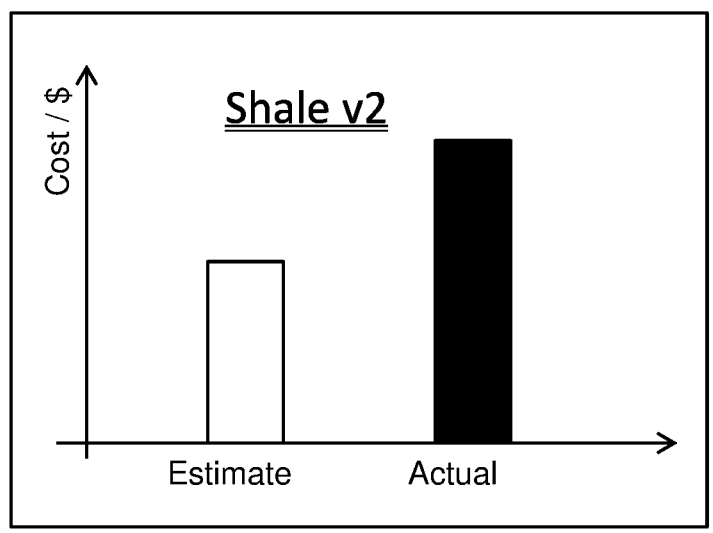
FIG. 9 is a display screen showing graphical data corresponding to a selected industrial plant.

This embodiment is configured to allow the user to move back and forth between the database view, a report view (in which data from the database is collated and displayed in the form of a report) and the map view. In this case, the user wishes to see data corresponding to the 'Shale v2' oil-rig which is indicated by the industrial plant icon 812h on the bottom right of the map view. To view the desired report, the user interacts with the industrial plant icon 812h to select the 'Shale v2' industrial plant icon and selects from a number of data display options. In this case, the user wishes to see how the actual cost of the plant compares to the estimated cost, so the user selects the appropriate data display option. The resulting data report display is shown in FIG. 9.

Figure 10:
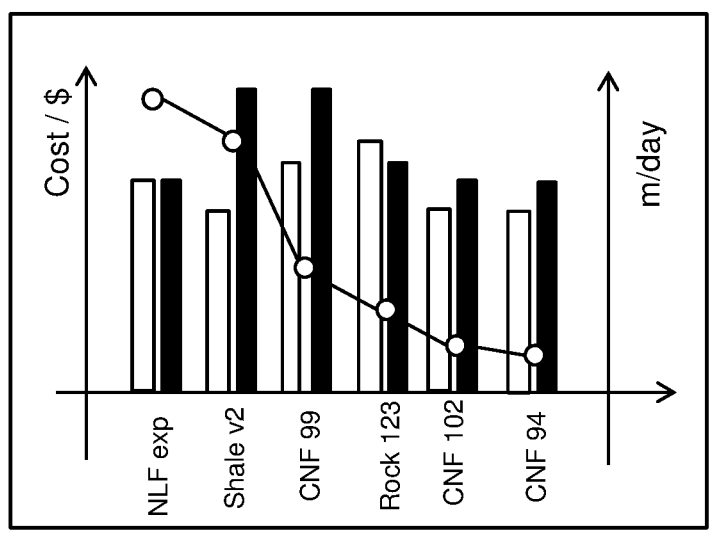
FIG. 10 is a display screen showing graphical data corresponding to the map-displayed industrial plants.

In this case, the user can also compare the estimated and actual costs of the other industrial plants in the map view (as shown in FIG. 8). This is shown in FIG. 10. In this case, the industrial plants are displayed in order of drilling rate (which is the parameter used in the statistical analysis, in this case).

It will be appreciated that the control apparatus may be configured to allow the user to select a different statistical analysis and to display the results of the selected statistical analysis on the display (e.g. in the map view, in the database view and/or in a graphical format). For example, the control apparatus may be configured, in this case, to allow the user to elect to perform a statistical analysis on the estimated and actual costs of the displayed industrial plants. For example, the control apparatus may be configured by the user to calculate the average and standard deviation of the actual cost of the industrial plant. This would allow the user to see from the map view that, although the 'Shale v2' oil rig has an above-average drilling rate, the actual cost of the 'Shale v2' oil rig is also higher than average. In other embodiments, statistical analysis may be performed on a combination of parameters. For example, the statistical analysis may compare the actual cost divided by the drilling rate. Parameters stored directly in the database or derived parameters (calculated from raw data in the database) may include, but are not limited to: drilling speed; depth of drilling (for a well or particular drill bit); cost per meter drilled; average cement returns to surface versus % excess cement pumped.

The controller may be configured to allow the user to select a performance indicator (e.g. corresponding to a parameter stored directly in the database or a derived parameter) for statistical analysis. That is, a user interface controller configured to allow the user to select a performance indicator, the performance indicator corresponding to a relationship between one or more parameters from the database; and the processor may be configured to perform a statistical analysis based on the selected performance indicator on the industrial plant performance data associated with the subset of the corresponding locations in the database, and to enable display of results of the first statistical analysis on the displayed map.

The control apparatus may be configured to visually identify the best or worst industrial plant on the display based on a particular parameter including, but not limited to (e.g.: fastest or longest drill bit run, most efficient drilling performance (m/d), lowest cost per meter drilled, average cement returns to surface versus % excess cement pumped).

Figure 11:
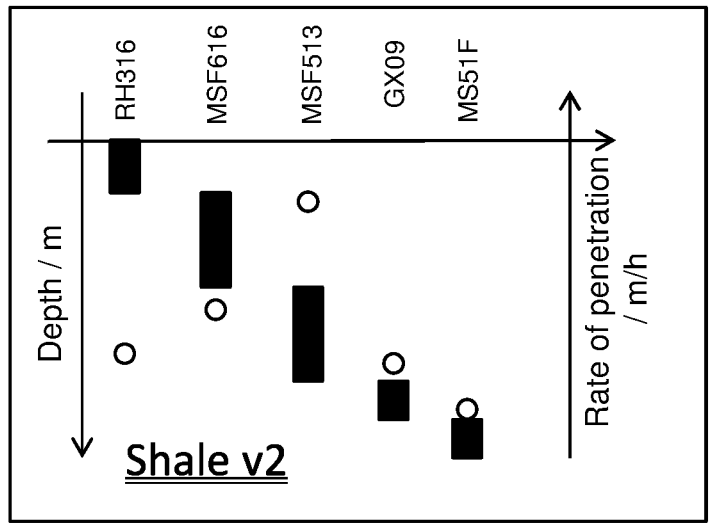
FIG. 11 is a display screen showing graphical data corresponding to a selected industrial plant.
Figure 12:
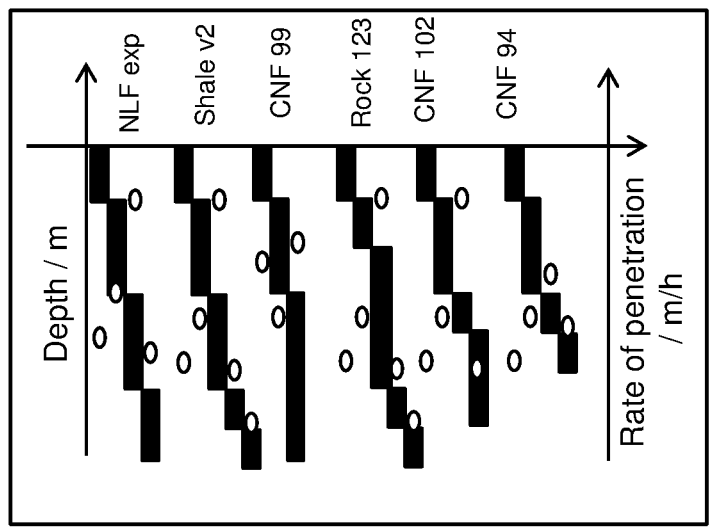
FIG. 12 is a display screen showing graphical data corresponding to the map-displayed industrial plants.
Figure 13:
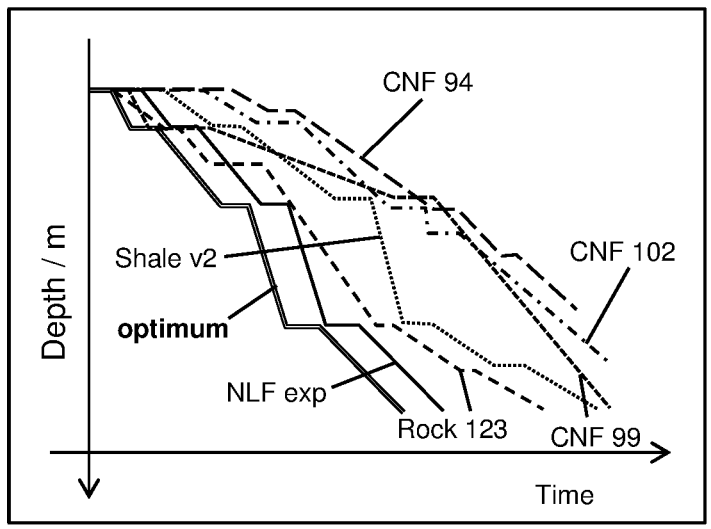
FIG. 13 is a display screen showing graphical data corresponding to the map-displayed industrial plants.

FIGS. 11-13 show a different reporting display. In FIG. 11, the various drills used to create the 'Shale v2' well are shown ordered by depth drilled. The vertical bars indicate the depth range at which each drill was used. The circles indicate the drilling rate for each drill. In this case, the user navigated to the display shown in FIG. 11 by selecting a particular industrial plan icon and selecting a drilling report from a revealed list.

From FIG. 11, the user can select to see the corresponding data for the other plants in the selected area. FIG. 12 shows a comparison of all the drills used to drill all of the displayed industrial plants. As in FIG. 12, the wells are ordered by the average drilling rate.

FIG. 13 shows an alternative representation of the data in FIG. 12. In this case, the drilling depth for each rig is shown with time from an initial drilling-start time (e.g. corresponding to well spudding). In this case, the control apparatus is configured to compare the various phases of the subset of wells in the selected geographical area and determine which of the drills used in each phase was the most effective (i.e. had the highest drilling rate or productivity). From this information, the control apparatus is configured to calculate a theoretically optimum drilling schedule, which takes into account the drills with the greatest drilling rate and the downtime necessary to change drills. That is, embodiments may be configured to combine information from the plants within the selected area to present statistical best-efforts results.

Figure 14:
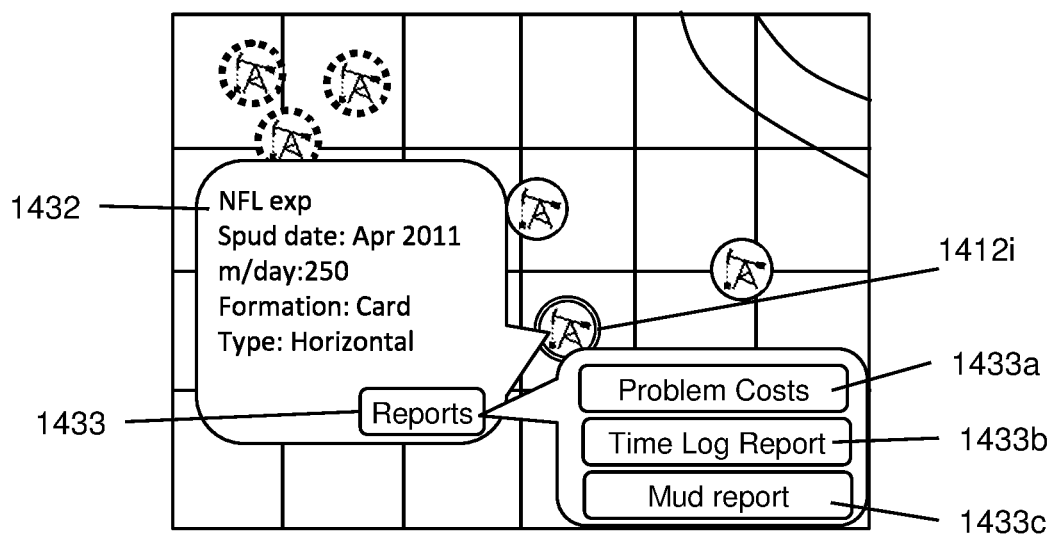
FIG. 14 is a display screen showing the user interacting with a map of the filtered data.
Figure 15:
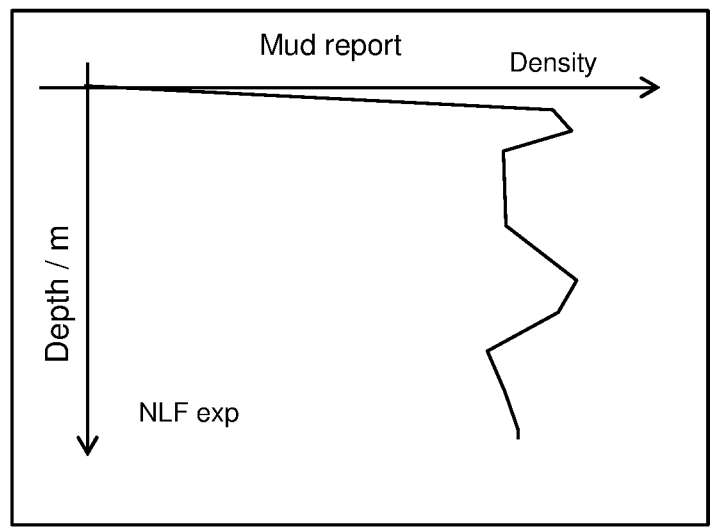
FIG. 15 is a display screen showing a report generated corresponding to the user-interaction of FIG. 14.

In FIG. 14, the user has returned to the map view and is in the process of selecting a new report to view. In this case, the user has selected a particular industrial plant (the 'NFL exp' oil rig industrial plant icon 1412$i$ in this case). Selecting a particular industrial plant, in this case, displays a brief summary 1431 of data associated with this industrial plant including when drilling was commenced (spud date); average drilling rate; geological formation; and drill type. The summary also includes a 'Reports' user interface element 1432 which, when selected, allows the user to select which report 1433$a$-$c$ to view. In this case, the user selects to view the 'mud report' 1433$c$. The mud report (as shown in FIG. 15) is derived by examining the physical properties of the drilling medium (most commonly called drilling mud). In this case, the density of the material for a given depth is displayed. This information is important as the drilling fluid density required to control reservoir pressure during drilling operations is indicative of the reservoir pressure and corresponding potential productivity of the wellbore.

After viewing the mud report, the user navigates back to the map view (as shown in FIG. 8). The user then wishes to view a different geographic area and so scrolls the map. In this case, this includes new industrial plant locations 1612$o$ in the displayed map. In response to the selected geographical area being changed by being scrolled, the processor is configured to perform a new statistical analysis on the industrial plant performance data associated with locations 1612$a$-$d$,$i$,$o$ within the second selected geographical area and to enable display of results of the second statistical analysis on the displayed map. As before, the results of the statistical analysis are shown by displaying a border on each industrial plant icon which is dependent on how the parameter for that industrial plant compares with the results of the statistical analysis.

Figure 16:
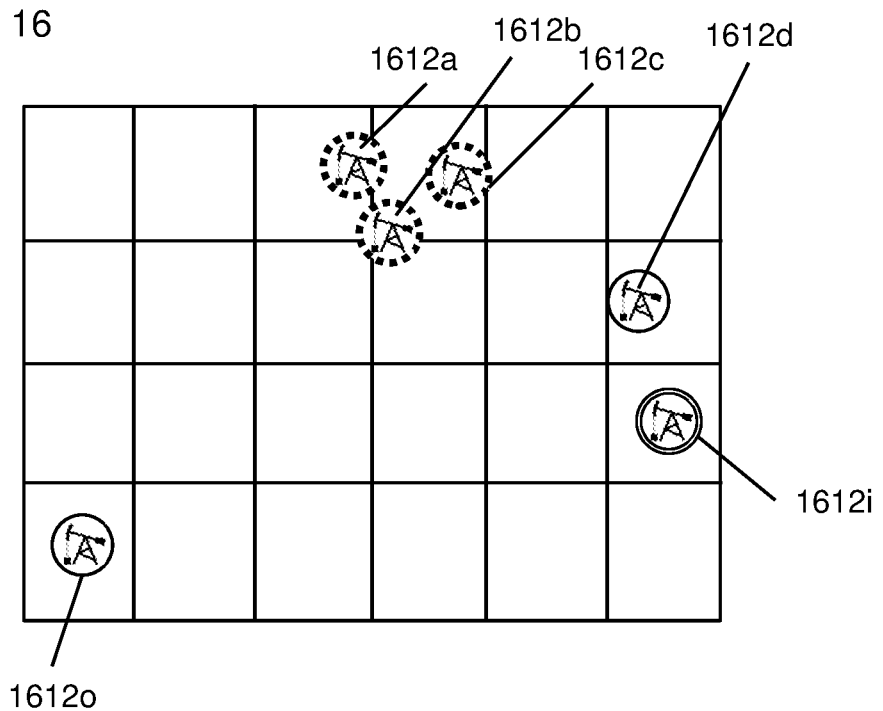
FIG. 16 is a display screen showing the results of a scrolling action.
Figure 17:
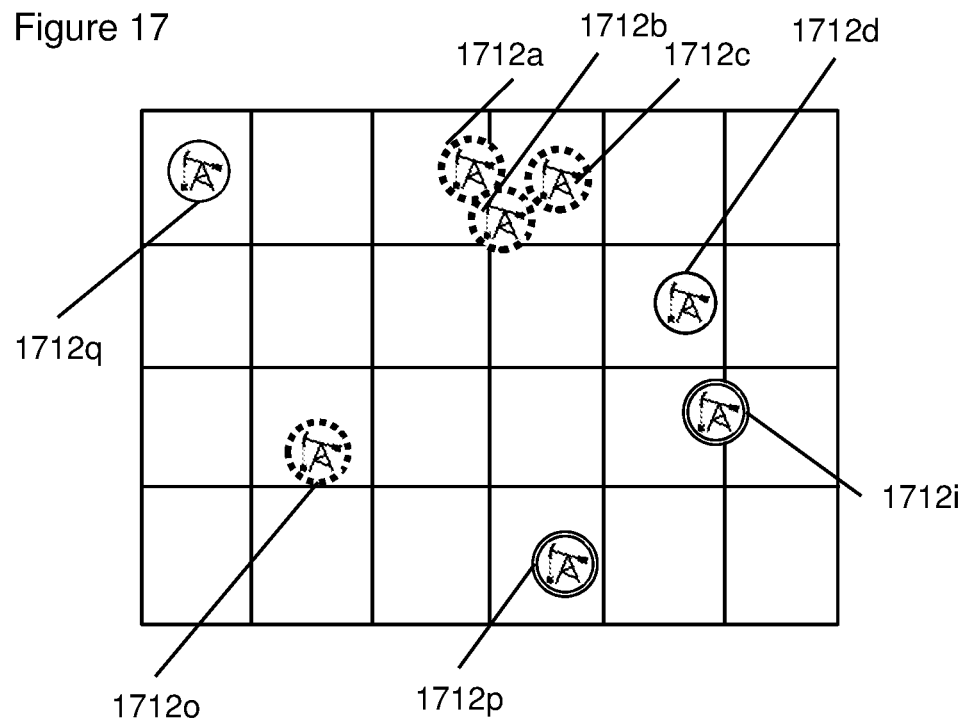
FIG. 17 is a display screen showing the results of a zooming action.

The user then wishes to view a larger geographical area and so zooms out using a pinch-out multi-touch gesture. In this case, the zooming-out results in additional industrial plants 1712$p$,$q$ being included in the selected displayed geographical area. In response to the geographical area being changed by being zoomed, the processor is configured to perform a new statistical analysis on the industrial plant performance data associated with locations within the second selected geographical area and to enable display of results of the second statistical analysis on the displayed map. As before, the results of the statistical analysis are shown by displaying a border on each industrial plant icon which is dependent on how the parameter for that industrial plant compares with the results of the statistical analysis. For example, based on the new statistical analysis, the industrial plant 1612$o$ which was within one standard deviation of the average based on the industrial plants within the geographical area of FIG. 16 is not more than one standard deviation below average as indicated by the corresponding plant icon 1712$o$ in FIG. 17.

Figure 18:
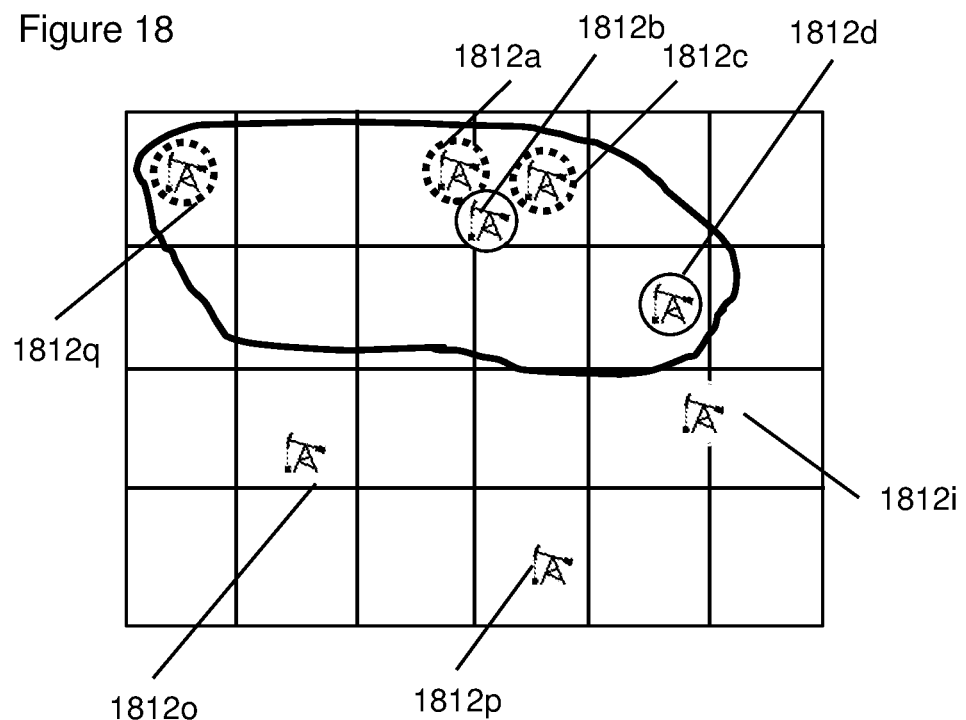
FIG. 18 is a display screen showing another method of selecting a geographical area.

It will be appreciated that there may be other ways of selecting a geographical area within a display. In the case shown in FIG. 18, the control apparatus is configured to: in response to a user input, enable selection of a geographical area by selecting a portion of a displayed map. This is shown in FIG. 18 where the user has selected a geographical area by drawing a line around a portion of the displayed map. In response to this new selection, the control apparatus is configured to perform a new statistical analysis on the industrial plant performance data associated with locations within the second selected geographical area and to enable display of results of the second statistical analysis on the displayed map. In this case, one of the industrial plants shown in FIG. 17 (indicated by plant icon 1812$b$) as being below average is now within one standard deviation of being average. Those plants which are not part of the statistical analysis are, in this case, indicated by the corresponding plant icons 1812$i$,$o$,$p$ not having a border.

Figure 19:
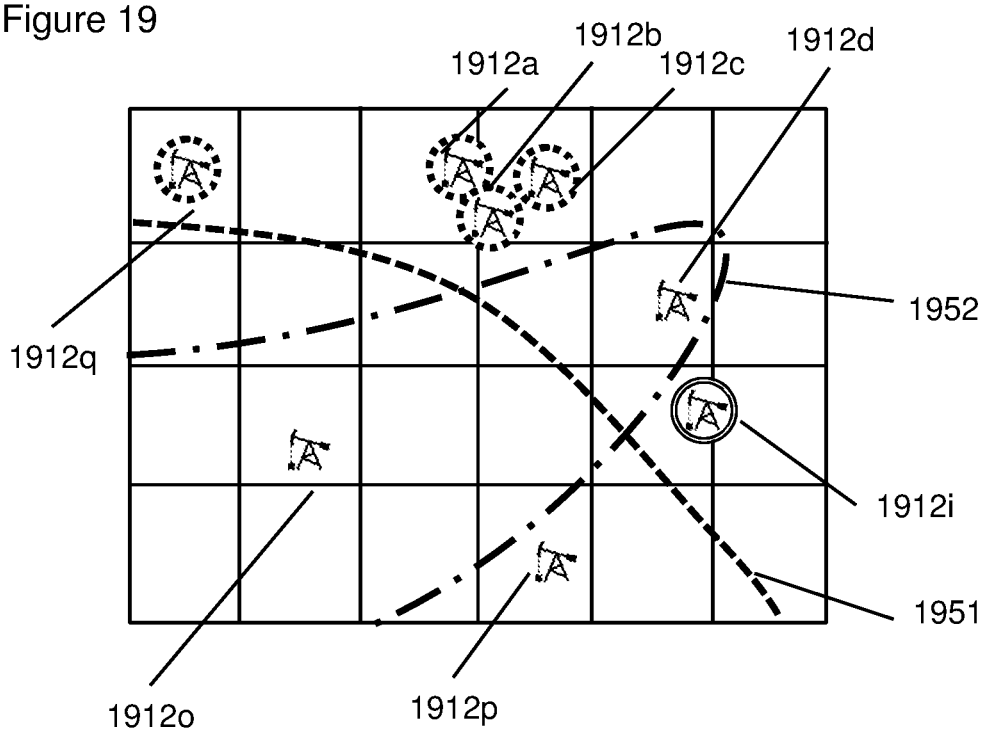
FIG. 19 is a display screen showing another method of selecting a geographical area.

In the case shown in FIG. 19, the control apparatus is configured to: in response to a user input, enable selection of a geographical area by selecting a characteristic from a list of characteristics. This is shown in FIG. 19 where the user has selected a geographical area by defining that the industrial plants must be within 50 km of a water source (boundary shown by dashed line 1951) and to be below 1000 m above sea level (boundary shown by dash-dot line 1952). In response to this new selection, the control apparatus is configured to perform a new statistical analysis on the industrial plant performance data associated with locations within the second selected geographical area and to enable display of results of the second statistical analysis on the displayed map.

It will be appreciated that the results of the statistical analysis may be displayed in other ways. For example, the area of the displayed geographical area may be divided up into regions based on the closest industrial plant location (e.g. using a Voronoi tessellation), and each of the regions (e.g. Voronoi cells) may be coloured (or otherwise differentiated) based how the parameters of the closest industrial plant compares with the statistical analysis. In another embodiment, geographic positions between industrial plant locations may be associated with a statistical value based on the statistical results of neighbouring industrial plants (e.g. a weighted average of the three closest industrial plants where the influence of each neighbouring industrial plant is scaled based on the distance to the geographic position). This may allow potential industrial plant sites to be assessed more easily.

It will be appreciated that the statistical analysis method may be set by the user. For example, the user may elect to use the median value as the average rather than the mean.

Figure 20:
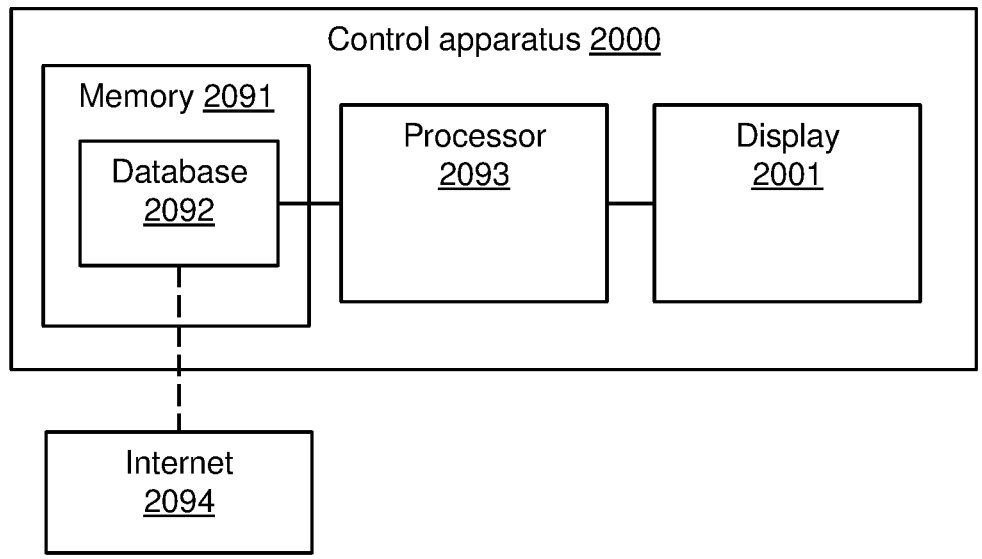
FIG. 20 is a schematic of the control apparatus.

FIG. 20 is a schematic of the control apparatus. In this case, the control apparatus 2000 comprises a memory 2091 storing a database 2092; a processor 2093; and a display 2001.

Memory 2091 may comprise one or more of, for example: a CD, a DVD, flash memory, a floppy disk, a hard disk, volatile memory, non-volatile memory or Random Access Memory.

A processor 2093 may comprise one or more of, for example: a central processing unit (CPU); a microprocessor; a central processing unit contained on a single integrated circuit (IC); an application-specific integrated circuit (ASIC); an application-specific instruction set processor (ASIP); a graphics processing unit (GPU); a network processor, a microprocessor specifically targeted at the networking application domain; a multi-core processor.

A display may comprise one or more of, for example: a cathode ray tube or liquid crystal display (LCD); a computer screen; a smartphone screen; a tablet computer screen; a touchscreen; a projection screen; and a television screen.

A user interface controller may comprise one or more of, for example, a touchscreen, a keyboard, a mouse, a joystick, and a touchpad.

The controller may be configured to interact with remote databases to populate the local database. The remote databases may be accessible via the internet 2094. It will be appreciated that the memory, processor and display may not be part of a single computer. That is, the various components may be stored across several devices. For example, the database may be stored on a cloud computer. That is, the end user may have a client terminal which is configured to access a remote server which performs the calculations. Some embodiments may be configured to mine published data (e.g. published on the internet). For example, the controller may be configured to extract key data points from electronic media (e.g.: XLS, PDF, XML, CSV, PPT, etc.) sources without user intervention store the extracted data in the database.

Figure 21:
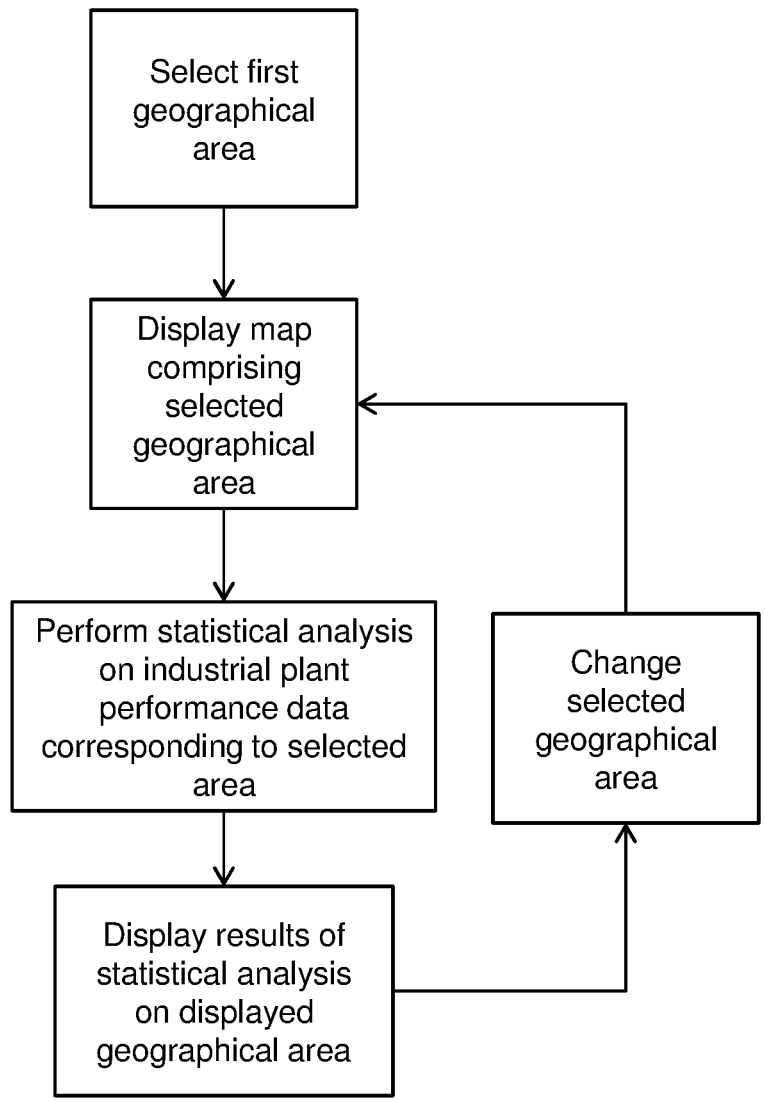
FIG. 21 is a schematic of the method carried out by the control apparatus.

FIG. 21 is a flow diagram showing a method of processing data. That is, first a geographical area is selected. This geographical area is then displayed as a map view. The selected geographical area, in this case, includes a first subset of the corresponding locations in the database, each of the corresponding locations being associated with an industrial plant and other data relating to that industrial plant.

A statistical analysis is then performed on industrial plant performance data corresponding to the selected data. The results of the statistical analysis are then displayed on the displayed geographical area.

The method comprises, in response to the selected geographical area being changed, displaying a new map comprising the newly selected geographical area and performing the statistical analysis of the plants within the newly selected geographical area for display on the map.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A control apparatus comprising:
   memory comprising a database having data on industrial plant performance, each datum associated with a location;
   a display configured to display a map comprising a selected first geographical area, the first geographical area including a first subset of the corresponding locations in the database;
   a processor configured to perform a first statistical analysis on the industrial plant performance data associated with the first subset of the corresponding locations in the database, and to enable display of results of the first statistical analysis on the displayed map;
   a graphical user interface controller configured to allow the user to change the selected geographical area displayed from the first geographical area to a second geographical area, the second geographical area including a second subset of the corresponding locations in the database, the second subset being different from the first subset; and
   wherein the processor is configured, in response to a change in the geographical area being selected, to perform dynamically a second statistical analysis on the industrial plant performance data associated with locations within the second selected geographical area and dynamically to enable display of results of the second statistical analysis on the displayed map.

2. The control apparatus of claim 1, wherein the selected geographical area corresponds to the area of a map displayed on the display, such that the graphical user interface controller is configured to allow the user to change the selected geographical area by changing the area of a map displayed on the display.

3. The control apparatus of claim 1, wherein the graphical user interface controller is configured to allow the user to change the selected geographical area by one or more of scrolling and zooming the area of a map displayed on the display.

4. The control apparatus of claim 1, wherein the industrial plant data corresponds to oil drilling industrial plants.

5. The control apparatus of claim 1, wherein the industrial plant data corresponds to mining industrial plants.

6. The control apparatus of claim 1, wherein the control apparatus is configured to: in response to a user input, display a portion of the database corresponding to data associated with the selected locations.

7. The control apparatus of claim 1, wherein the control apparatus is configured to:
   in response to a first user input, filter data in the database to generate a filtered subset of corresponding locations; and in response to a second user input, display a map corresponding to the filtered data.

8. The control apparatus of claim 1, wherein the control apparatus is configured: to determine, as part of the statistical analysis, one or more of the average and the standard deviation parameters corresponding to the displayed subset of locations; and
   to enable display of the determinations by distinguishing locations based on how the parameter associated with each location compares with one or more of the determined average and the determined standard deviation.

9. The control apparatus of claim 1, wherein the control apparatus is configured:
   to enable, in response to a user input, selection of a geographical area by selecting a portion of a displayed map.

10. The control apparatus of claim 1, wherein the control apparatus is configured to: in response to a user input, enable selection of a geographical area by selecting one or more characteristic from a list of characteristics.

11. The control apparatus of claim 1, wherein the control apparatus is configured to: perform the statistical analysis on corresponding locations within the selected geographical area only when the number of corresponding locations is below a predetermined threshold.

12. The control apparatus of claim 1, wherein the industrial plant locations are displayed on the map using industrial plant icons; and the results of the statistical analysis are displayed on the displayed map by differentiating the industrial plant icons.

13. The control apparatus of claim 12, wherein the industrial plant icons are differentiated based on the statistical analysis using one or more of: different colors; different shapes; different sizes; different images; and different line styles.

14. The control apparatus of claim 1, wherein the control apparatus is configured to rank the industrial plants corresponding to locations within the selected geographical area based on the statistical analysis.

15. The control apparatus of claim 1, wherein the control apparatus is configured to bin the data into categories, wherein at least one category comprises multiple industrial plants.

16. The control apparatus of claim 1, wherein the industrial plant performance data is associated with industrial plants each of which is independently operable of the other industrial plants within the selected geographical area.

17. A method, the method comprising:
accessing a database having data on industrial plant performance, each datum associated with a location;
displaying a map comprising a selected first geographical area, the first geographical area including a first subset of the corresponding locations in the database;
performing a first statistical analysis on the industrial plant performance data associated with the first subset of the corresponding locations in the database, and to enable display of results of the first statistical analysis on the displayed map;
changing the selected geographical area displayed from the first geographical area to a second geographical area, the second geographical area including a second subset of the corresponding locations in the database, the second subset being different from the first subset; and
dynamically performing, in response to a change in the geographical area being selected, a second statistical analysis on the industrial plant performance data associated with locations within the second selected geographical area and enabling display dynamically of results of the second statistical analysis on the displayed map.

* * * * *